UNITED STATES PATENT OFFICE.

GEORG RUPPRECHT, OF HAMBURG, GERMANY.

PROCESS FOR THE MANUFACTURE OF FLUORESCENT SUBSTANCES.

1,073,932. Specification of Letters Patent. Patented Sept. 23, 1913.

No Drawing. Application filed December 16, 1911. Serial No. 666,209.

*To all whom it may concern:*

Be it known that I, GEORG RUPPRECHT, a citizen of the free town of Hamburg, and resident of 57 Richardstrasse, city of Hamburg, in the German Empire, have invented a Process for the Manufacture of Fluorescent Substances, of which the following is a specification.

This invention relates to the manufacture of fluorescent substances which will become highly luminous under the action of Roentgen-rays or the like.

According to the present invention the fluorescent substance consists essentially of a pure synthetically produced basic zinc or cadmium salt of a refractory salt-forming acid to which a small percentage of a modifying agent or agents is added.

In carrying out the present invention the fluorescent substance may be obtained by heating or fusing a mixture of silicon dioxid and zinc oxid in the proportion of more than one molecule of zinc oxid for each molecule of silicon dioxid, a small percentage of a modifying agent being added thereto so as to increase the luminosity or modify the color of the fluorescence. The modifying agents may comprise the oxids, chlorids or silicates of platinum, gold, iron manganese, chromium, potassium or the like.

It will of course be readily understood that, if desired, such combinations of zinc may be used instead of zinc oxid as will yield zinc oxid under the action of heat, as for example, zinc nitrate, or whose acid is expelled at the fusing point by the silicon dioxid as, for example, zinc sulfate. The fluorescent substance thus obtained is pulverized and applied to any suitable backing or screen in the usual manner.

The following example is given of suitable ingredients and the proportions thereof for producing a fluorescent screen according to my invention, although it is to be understood that I do not limit myself to the ingredients and proportions given therein:—

| | | | | |
|---|---|---|---|---|
| 31 | parts | by | weight | of $SiO_2$ |
| 67.5 | " | " | " | " $ZnO$ |
| 0.25 | " | " | " | " $ThO_2$ |
| 0.65 | " | " | " | " $CeO_2$ |
| 0.36 | " | " | " | " $MnO$ |
| 0.14 | " | " | " | " $Fe_2O_3$ |
| 0.08 | " | " | " | " $PtCl_4$ |
| 0.02 | " | " | " | " $AuCl_3$ |

The mixture is fused at a temperature of above 1300° C. and the resultant product ground to a powder and applied to the screen in the usual manner.

The zinc of the zinc silicate hereinbefore referred to may be either wholly or partly replaced by cadmium which is also one of the earth metals of the zinc group of the periodic system, while the silicon dioxid may be more or less advantageously replaced by titanic oxid, tungstic oxid, molybdic oxid or vanadic oxid. Such fluorescent substances may for example be produced by fusing a mixture of zinc or cadmium oxid with one of the acidic oxids hereinbefore referred to in accordance with the formula of a basic salt. The product after cooling is then pulverized and used in a similar manner as a coating for the fluoroscopic screen to be produced.

I claim:—

1. As a new article of manufacture, a fluorescent substance comprising an artificially produced basic salt of a refractory salt forming acid, and one of the earth metals of the zinc group of the periodic system, and a small percentage of a modifying agent.

2. As a new article of manufacture, a fluorescent substance consisting of an artificially produced basic silicate of one of the earth metals of the zinc group of the periodic system and a small percentage of a modifying agent.

3. As a new article of manufacture, a fluorescent substance comprising an artificially produced basic zinc salt of a refractory salt forming acid. and a small percentage of a modifying agent.

4. As a new article of manufacture, a fluorescent substance comprising artificially produced basic zinc silicate and a small percentage of a modifying agent.

5. As a new article of manufacture, a fluorescent substance comprising an artificially produced basic zinc salt and an artificially produced basic cadmium salt of a refractory salt forming acid, and a small percentage of a modifying agent.

6. As a new article of manufacture, a fluorescent substance comprising an artificially produced basic zinc silicate, an artificially produced basic cadmium silicate and a small percentage of a modifying agent.

7. The process for the manufacture of a fluorescent substance, which comprises mixing an oxid of one of the earth metals of the zinc group with a refractory salt forming acid in the proportions of a basic salt and a small quantity of a modifying agent, and in fusing the mixture.

8. The process for the manufacture of a fluorescent substance, which comprises mixing an oxid of one of the earth metals of the zinc group of the periodic system with a silicon dioxid in the proportions of a basic salt and a small quantity of a modifying agent, and in fusing the mixture.

9. The process for the manufacture of a fluorescent substance which comprises mixing zinc oxid with a refractory salt forming acid in the proportions of a basic salt, and a small quantity of a modifying agent, and in fusing the mixture.

10. The process for the manufacture of a fluorescent substance, which comprises mixing silicon dioxid and zinc oxid in the proportions of a basic salt, and a small percentage of a modifying agent and in fusing the mixture.

11. The process for the manufacture of a fluorescent substance, which comprises mixing zinc oxid and cadmium oxid with a refractory salt forming acid in the proportions of basic salts and a small quantity of a modifying agent, and in fusing the mixture.

12. The process for the manufacture of a fluorescent substance, which comprises mixing silicon dioxid, zinc oxid and cadmium oxid in the proportions of basic salts and a small percentage of a modifying agent, and in fusing the mixture.

13. The process for the manufacture of a fluorescent substance, which comprises mixing, in the requisite proportions to produce a basic salt, a refractory salt forming acid with a compound of one of the earth metals of the zinc group capable of yielding with the acid, under the action of heat, a basic salt, in adding a small quantity of a modifying agent to the mixture, and in fusing the mixture.

14. The process for the manufacture of a fluorescent substance, which comprises mixing a refractory salt forming acid in the requisite proportion to produce a basic salt, with a compound of zinc capable of yielding with the acid, under the action of heat, a basic salt, in adding a small quantity of a modifying agent to the mixture and in fusing the mixture.

15. The process for the manufacture of a fluorescent substance, which comprises mixing silicon dioxid, in the requisite proportion to produce a basic salt, with a compound of zinc capable of yielding with the silicon dioxid, under the action of heat, a basic salt, in adding a small quantity of a modifying agent to the mixture, and in fusing the mixture.

In witness whereof I have hereunto set my hand in the presence of two witnesses.

GEORG RUPPRECHT.

Witnesses:
ERNEST H. L. MUMMENHOFF,
IDA CHRIST HAFERMANN.